(12) United States Patent
Huang et al.

(10) Patent No.: US 8,873,627 B2
(45) Date of Patent: Oct. 28, 2014

(54) METHOD AND APPARATUS OF VIDEO CODING USING PICTURE STRUCTURE WITH LOW-DELAY HIERARCHICAL B GROUP

(75) Inventors: Yu-Wen Huang, Taipei (TW); Jian-Liang Lin, Yilan (TW); Yu-Pao Tsai, Kaohsiung (TW)

(73) Assignee: Mediatek Inc, Hsinchu (TW)

( * ) Notice: Subject to any disclaimer, the term of this patent is extended or adjusted under 35 U.S.C. 154(b) by 862 days.

(21) Appl. No.: 13/089,474

(22) Filed: Apr. 19, 2011

(65) Prior Publication Data

US 2012/0140825 A1    Jun. 7, 2012

Related U.S. Application Data

(60) Provisional application No. 61/420,659, filed on Dec. 7, 2010.

(51) Int. Cl.
*H04N 7/12* (2006.01)
*H04N 19/61* (2014.01)
*H04N 19/00* (2014.01)
*H04N 19/50* (2014.01)

(52) U.S. Cl.
CPC ........... *H04N 7/26* (2013.01); *H04N 19/00781* (2013.01); *H04N 7/32* (2013.01)
USPC .................................................. 375/240.15

(58) Field of Classification Search
USPC ................... 375/240, 240.01, 240.12, 240.15
See application file for complete search history.

(56) References Cited

U.S. PATENT DOCUMENTS 6,072,831 A    6/2000  Chen
2005/0117642 A1  6/2005  Abe et al.

FOREIGN PATENT DOCUMENTS

| CN | 1175859 A | 3/1998 |
| CN | 101297555 A | 10/2008 |
| JP | 1998-174110 A | 6/1998 |
| JP | 2004-88736 A | 3/2004 |
| JP | 2006-324906 A | 11/2006 |
| JP | 2009-510952 A | 3/2009 |

*Primary Examiner* — Allen Wong
(74) *Attorney, Agent, or Firm* — Blairtech Solution LLC

(57) ABSTRACT

A method and apparatus for encoding a video sequence comprising a plurality of pictures are disclosed. In video coding systems, the temporal redundancy is exploited using motion compensated prediction. The video sequence is often organized into multiple GOP (group of pictures) where different types of GOP may be used. In conventional coding systems, IPPP and IBBP GOP structure is often used. In H.264/AVC and the emerging High Efficiency Video Coding (HEVC), hierarchical GOP structure, including hierarchical P GOP structure and hierarchical B GOP structure, has been introduced to allow temporal scalability. Furthermore, low-delay IBBB GOP structure has been also introduced, for low-delay application. In the present invention, a low-delay hierarchical B GOP structure is disclosed. The new structure uses low-delay B-pictures only so as to minimize the processing delay while the hierarchical structure provides the temporal scalability. The low-delay hierarchical B GOP structure has been shown to result in substantial improvement in coding efficiency.

14 Claims, 5 Drawing Sheets

METHOD AND APPARATUS OF VIDEO CODING USING PICTURE STRUCTURE WITH LOW-DELAY HIERARCHICAL B GROUP

CROSS REFERENCE TO RELATED APPLICATIONS

The present invention claims priority to U.S. Provisional Patent Application Ser. No. 61/420,659, filed Dec. 7, 2010, entitled "Low-Delay Hierarchical B Group of Pictures Structure". The U.S. Provisional Patent Application is hereby incorporated by reference in its entirety.

FIELD OF THE INVENTION

The present invention relates to video coding. In particular, the present invention relates to coding techniques associated with picture structure for motion compensated coding.

BACKGROUND

In video coding systems, the temporal redundancy is exploited using temporal prediction to reduce the video data to be transmitted or stored. Neighboring pictures in a video sequence often bear great similarities, and simply using picture differences can effectively reduce the transmitted information associated with static background areas. Nevertheless, moving objects or panned/zoomed scenes in the video sequence may result in substantial residues and will require higher bitrates to code the residues. Consequently, Motion Compensated Prediction (MCP) is often used to exploit temporal correlation in video sequences. In MCP systems, Intra-coding is used to transmit an initial picture (or Intra-coded picture; I-picture), and the I-pictures are inserted periodically to allow quick access to the compressed video data or to alleviate error propagation.

In older coding systems such as MPEG-1/2, the video sequence is organized into multiple GOP (group of pictures) where different types of GOP may be used for different application. A video sequence may be encoded using I-pictures only which allows full random access to the compressed video. However, while such system has low computational complexity, the coding efficiency is low. The IPPP GOP structure consists of I-pictures and Predicted pictures (P-pictures) where the P-picture is processed using forward motion prediction. The IPPP GOP structure usually achieves much better coding efficiency than the I-picture only processing. However, the computational complexity associated with the IPPP GOP structure is much higher than that for the I-picture only processing due to required motion estimation processing. A system based on the IPPP GOP structure results in low processing delay since the processing of a current picture depends on a previously coded picture only and there is no need to wait for future pictures. Consequently, the IPPP GOP structure is suited for low delay applications such as video conferencing. The IBBP GOP structure is another widely used GOP structure in the MPEG-1/2 standards. Beside I-pictures and P-pictures, the IBBP GOP structure uses one or more B-pictures between an I-picture and a P-picture, or between two P-pictures. In the MPEG-1/2 standards, the B-picture is bi-directionally predicted picture based on one past picture and one future picture in the display order. The IBBP GOP structure requires higher computational complexity due to the bi-directional motion estimation. However, the IBBP GOP structure results in further bitrate reduction over the IPPP GOP structure.

In H.264/AVC, the granularity of the establishment of prediction types is applied based on a lower level called the slice. A slice is a spatially distinct region of a picture that is encoded separately from any other region in the same picture. In H.264/AVC, I-slices, P-slices, and B-slices are used to refer to the regions coded with respective prediction types instead of I-pictures, P-pictures, and B-pictures. Typically, pictures are segmented into macroblocks, and individual prediction types can be selected on a macroblock basis. For H.264/AVC, an I-picture can contain only intra macroblocks, a P-picture can contain either intra macroblocks or predicted macroblocks, and a Bi-predictive picture (B-picture) can contain intra, predicted, or bi-predicted macroblocks. In H.264/AVC and the emerging High Efficiency Video Coding (HEVC), predicted pictures may use multiple previously-decoded pictures as references, and the predicted frames can have arbitrary display-order relationship relative to the picture(s) used for prediction. While a B-picture in the MPEG-1/2 standards is referring to a picture coded using bi-directional prediction, a B-picture in H.264 and HEVC is referring to a bi-predictive picture that can use reference pictures in both reference picture list 0 and reference picture list 1.

In H.264 and HEVC, hierarchical GOP structure, including hierarchical P GOP structure and hierarchical B GOP structure, has been used to allow temporal scalability. On the other hand, low-delay B GOP structure has also been disclosed, where all B-pictures used are low-delay B-pictures that use reference pictures from list 0 and list 1, where the reference pictures from list 0 and list 1 contain only pictures prior to the B-picture in the display order. It is desirable to develop a new GOP structure that can take advantage of the high coding efficiency and temporal scalability offered by hierarchical GOP structure and the low-delay feature of low-delay B-pictures. Accordingly, the present invention discloses a low-delay hierarchical B GOP structure.

BRIEF SUMMARY OF THE INVENTION

A method and apparatus for encoding a video sequence having a plurality of pictures are disclosed. In one embodiment according to the present invention, the method and apparatus for encoding a video sequence having a plurality of pictures comprises steps of dividing the plurality of pictures into a set of group of pictures, dividing each group of pictures into at least two temporal layers with hierarchical structure, and encoding each picture in group of pictures as an I-picture, a low-delay B picture, or a P-picture. The I-picture is only allowed in a lowest temporal layer and there is at least one low-delay B-picture used in the group of pictures. According to the temporal hierarchical structure, a picture in a lower temporal layer does not reference to any picture in a higher temporal layer. In order to achieve better system performance, an embodiment according to the present invention uses smaller quantization parameters for pictures in a lower temporal layer than quantization parameters for pictures in a higher temporal layer. In the lowest temporal layer, the I-picture can be inserted periodically. In the highest temporal layer, the picture encoded can be either a reference picture or a non-reference picture.

DETAILED DESCRIPTION OF THE INVENTION

Figure 1:
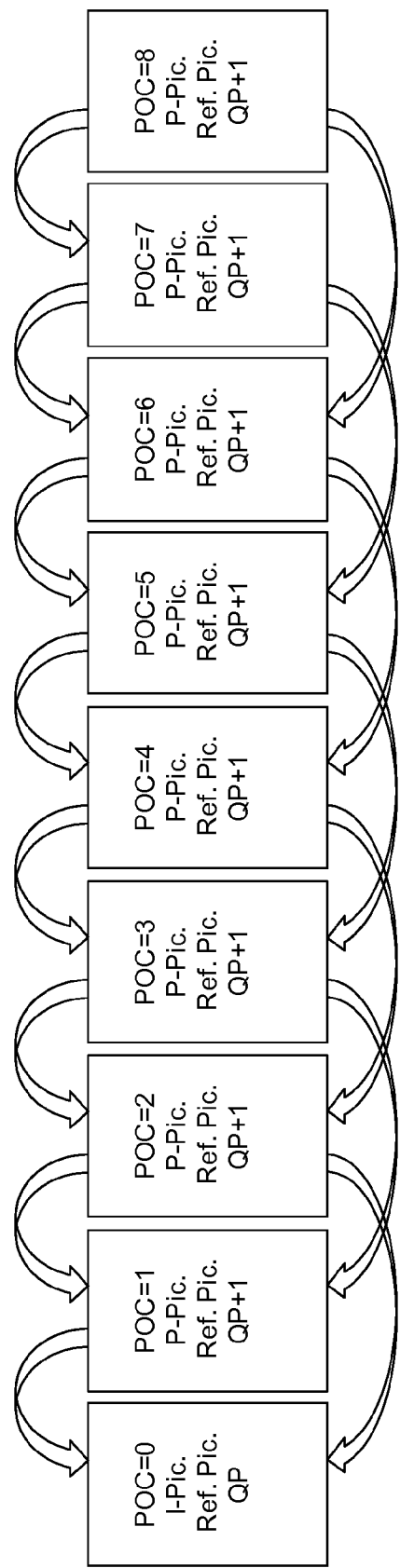
FIG. 1 illustrates a low-delay IPPP GOP structure using two reference pictures.

In video coding systems, the temporal redundancy is exploited using temporal prediction to reduce the video data to be transmitted or stored. Neighboring pictures in a video sequence often bear great similarities, and simply using picture differences can effectively reduce the transmitted information associated with static background areas. Nevertheless, moving objects and panned/zoomed scenes in the video sequence may result in substantial prediction residues and consequently will require higher bitrates to code the residues. Therefore, Motion Compensated Prediction (MCP) is often used to exploit temporal correlation in video sequences. In MCP systems, Intra-coding is used to transmit an initial picture (or I-picture), and I-pictures are inserted periodically to allow quick access to the compressed video data or to alleviate error propagation.

Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilizes a decoded picture or pictures after the current picture in the display order. Since the first version of H.264/AVC was finalized in 2003, forward prediction and backward prediction have been extended to reference picture list 0 prediction and reference picture list 1 prediction respectively, where both list 0 and list 1 can contain multiple reference pictures prior to or later than the current picture in the display order.

While the terms "frame" and "picture" are often used interchangeably in the field, strictly speaking, the term "picture" is a more general notion, since it can be referred to either a frame or a field. On the other hand, a frame is a complete image captured during a frame period, and a field comprises odd-numbered scanning lines, called an odd field or even-numbered scanning lines, called an even field. When video is formed in an interlaced format, each frame of the video is transmitted as an odd field and an even field. Pictures that are used as a reference for predicting other pictures are referred to as reference pictures. And pictures that are not used as a reference for predicting other pictures are referred to as non-reference pictures. When a picture is coded without reference to other pictures, the picture is called an I-picture. Pictures that use a single motion vector for prediction of each region are called the P-pictures. Similarly, pictures that allow two motion vectors for prediction of each region are called the B-pictures.

In H.264/AVC, the granularity of the establishment of prediction types is applied based on a lower level called the slice. A slice is a spatially distinct region of a picture that is encoded separately from any other region in the same picture. In H.264/AVC, I-slices, P-slices, and B-slices are used to refer to the regions coded with respective prediction types instead of I-pictures, P-pictures, and B-pictures. Typically, pictures are segmented into macroblocks, and individual prediction types can be selected on a macroblock basis. The prediction type associated with a picture is defined for H.264/AVC as follows:

I-pictures can contain only intra macroblocks.

P-pictures can contain either intra macroblocks or predicted macroblocks.

B-pictures can contain intra, predicted, or bi-predicted macroblocks.

Similarly, frames can be designated as I-frames, P-frames and B-frames according to the prediction types for the frames.

For predicted frames (or P-frames/pictures/slices) in older video coding standards, such as MPEG-1/2, only one previously decoded picture in display order is referred. However, in H.264/AVC, predicted frames may use multiple previously-decoded pictures as references, and the predicted frames can have arbitrary display-order relationship with respect to the picture(s) used for prediction. For bi-predicted frames (or B-frames/pictures/slices), the bi-predicted frames may further include a prediction mode that forms a prediction of a motion region (e.g., a macroblock or a smaller area) by averaging the predictions obtained using two different previously-decoded reference regions. In older video coding standards, such as MPEG-1/2, only two previously-decoded pictures, one corresponding to an earlier display order and one corresponding to a later display with respect to the current picture, are used as references. Furthermore, a B-frame is not used as references for the decoding of other pictures in MPEG-1/2. Nevertheless, in H.264/AVC, a B-frame is allowed to use more than two previously-decoded pictures as references during decoding and the B-frame may have arbitrary display-order relationship relative to the picture(s) used for its prediction. A B-frame can also be used as references for the decoding of other pictures in H.264/AVC.

Among the various prediction types, the I-frames (or I-frames/pictures/slices) are usually allocated higher bitrates than the P-frames (or P-frames/pictures/slices) and B-frames (or B-frames/pictures/slices) to achieve better system performance. Furthermore, the P-frames (or P-frames/pictures/slices) are usually allocated higher bitrates than the B-frames (or B-frames/pictures/slices) to achieve better system performance. The bitrate allocation mechanism is usually accomplish via quantization parameter (QP) adjustment, where a larger QP will result in a lower bitrate due to coarser quantization and a smaller QP will result in a higher bitrate due to finer quantization.

In video coding systems, pictures are often organized into Group of Pictures (GOP) and each group of pictures are often transmitted or stored in a self-contain unit. There are several types of GOP structures commonly practiced in video coding systems. Different GOP structures can achieve different coding efficiency and require different resources in terms of computational complexity, memory storage, and memory access. For example, for the Intra GOP structure, all pictures are coded as I-pictures. The Intra GOP structure has low coding efficiency and requires low computational complexity since no motion compensation is used. The Intra GOP structure allows random access to any picture in the group without the need to decode neighboring pictures. The IPPP GOP structure processes the first picture in the group as an I-picture and processes all following pictures sequentially as P-pictures. The first picture in the IPPP GOP structure may also be a P-picture, which references to a decoded picture in the previous GOP. I-pictures can be inserted periodically to improve the picture accessibility as well as to alleviate error propagation in case of errors in the bitstream. The IPPP GOP structure involves higher computational complexity and results in better compression efficiency compared to the Intra GOP structure. The decoding of a P-picture does not rely on any future pictures in the display order and therefore it is suitable for low-delay applications. Another popular GOP structure used by the older video coding standards such as MPEG-1/2 is the IBBP GOP structure where one or more bi-directional pictures (B-pictures) are used between an I-picture and a P-picture, or two P-pictures. For example, the IBBP GOP may consist of $I_0$, $b_1$, $b_2$, $P_3$, $b_4$, $b_5$, $P_6$, $b_7$, $b_8$, ..., where the numerical index is the picture number in the display order. Two B-pictures are used between an I-picture and a P-picture, or two P-pictures in the above example. The B-pictures used in MPEG-1/2 are non-reference picture and the lower case letter "b" is used to designate non-reference B-pictures. The coding order of the IBBP GOP shown above is $I_0$, $P_3$, $b_1$, $b_2$, $P_6$, $b_4$, $b_5$, $P_9$, $b_7$, .... Usually the IBBP GOP structure achieves better coding efficiency than the IPPP GOP structure while the computational complexity is higher than the IPPP GOP structure.

Besides the Intra GOP, IPPP GOP, and IBBP GOP structures mentioned above, there are also hierarchical B GOP and hierarchical P GOP structures that can provide temporal scalability. The hierarchical B GOP structure comprises multiple B-pictures between an I-picture and a P-picture, or two P-pictures. The multiple B-pictures are organized in a hierarchical structure. For example, for a hierarchical B GOP with GOP length of 8, the GOP may consists of $I_0$, $b_1$, $B_2$, $b_3$, $B_4$, $b_5$, $B_6$, $b_7$, $P_8$, ..., $P_{16}$, ..., $P_{24}$, ..., where the lower case letter "b" is used to designate non-reference B-pictures and the upper case letter "B" is used to designate reference B-pictures. Again, I-pictures may be periodically inserted. The coding order of the hierarchical B GOP structure shown above can be $I_0$, $P_8$, $B_4$, $B_2$, $B_6$, $b_1$, $b_3$, $b_5$, $b_7$, $P_{16}$, ..., $P_{24}$, ... or $I_0$, $P_8$, $B_4$, $B_2$, $b_1$, $b_3$, $B_6$, $b_5$, $b_7$, $P_{16}$, ..., $P_{24}$, .... In the above example, pictures 8N (i.e., $I_0$, $P_8$, $P_{16}$, $P_{24}$, ...) are denoted as temporal layer 0, where N is an integer. Pictures (8N+4) are denoted as temporal layer 1, and pictures (8N+2) and (8N+6) are denoted as temporal layer 2. Pictures (8N+1), (8N+3), (8N+5) and (8N+7) are denoted as temporal layer 3. In order to support temporal scalability, a current picture cannot reference any picture belonging to a higher temporal layer than that of the current picture. In order to support random access with an arbitrary Intra picture as an entry point, an Inter picture after an Intra picture cannot reference any picture prior to the Intra picture in display order. To achieve better system performance, the coding system applies a smaller quantization parameter to the I-pictures than the P-pictures. The coding system applies a smaller quantization parameter to the P-pictures than the B-pictures. Among the B-pictures, a smaller quantization parameter is applied to the B-pictures in a lower temporal layer. While the GOP length of 8 is used in the above example, larger GOP length may also be used to provide more temporal layers. For example, GOP length of 16 or 32 may be used. While pictures in the highest temporal layer in the above example are non-reference pictures, however, pictures in the highest temporal layer can be reference pictures as well.

The temporal hierarchical structure shown above can also be applied to IPPP GOP structure. For example, a hierarchical P GOP with GOP length of 4 may consists of $I_0$, $p^1$, $P_2$, $p_3$, $P_4$, $p_5$, $P_6$, $b_7$, $P_8$, ..., where the lower case letter "p" is used to designate non-reference P-pictures and the upper case letter "P" is used to designate reference P-pictures. Again, I-pictures may be periodically inserted. The coding order of the hierarchical P GOP shown above can be $I_0$, $p_1$, $P_2$, $p^3$, $P_4$, $p_5$, $P_6$, $b_7$, $P_8$, .... In the above example, pictures 4N (i.e., $I_0$, $P_4$, $P_8$, ...) are denoted as temporal layer 0. Pictures (4N+2) are denoted as temporal layer 1, and pictures (4N+1) and (4N+3) are denoted as temporal layer 2. In order to support temporal scalability, a current picture cannot reference any picture belonging to a higher temporal layer than that of the current picture. In order to support random access with an arbitrary Intra picture as an entry point, an Inter picture after an Intra picture cannot reference any picture prior to the Intra picture in the display order. To achieve better system performance, the coding system applies smaller quantization parameters to the I-pictures than the P-pictures. Among the P-pictures, smaller quantization parameters are applied to the P-pictures in a lower temporal layer than the P-pictures in a higher temporal layer. While non-reference P-pictures are used in the highest temporal layer in the above example, reference P-pictures may be used in the highest temporal layer as well. While the GOP length of 4 is used in the above example, larger GOP length may also be used to provide more temporal layers. For example, GOP length of 8 or 16 may be used.

Figure 2:
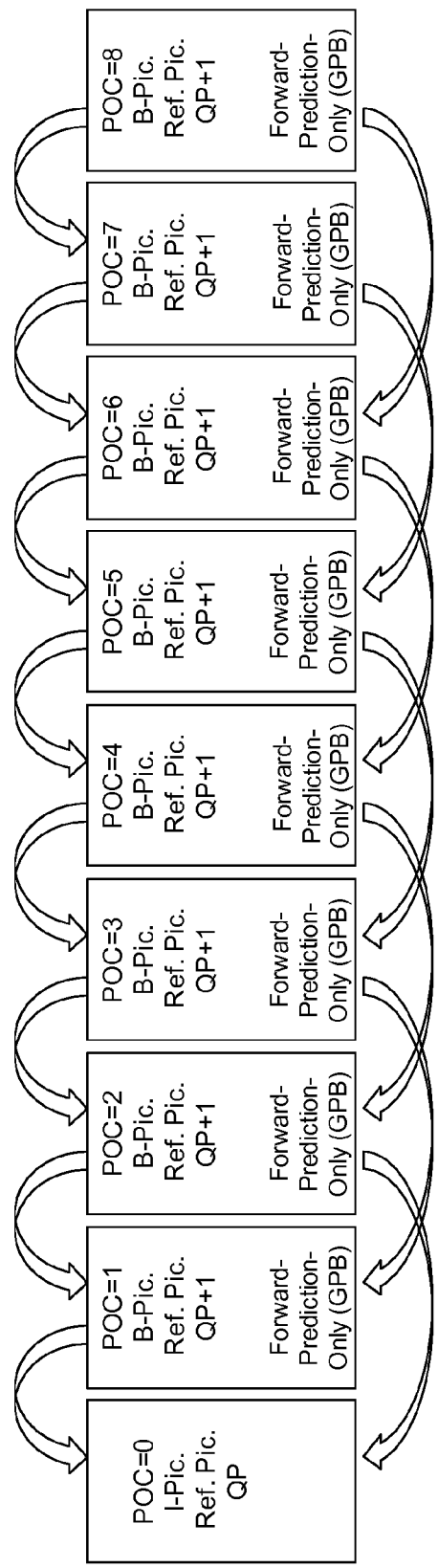
FIG. 2 illustrates a low-delay IBBB GOP structure using two reference pictures.

In the HEVC development, a low-delay IPPP GOP structure, which is the same as the conventional IPPP GOP structure, was used. An exemplary low-delay IPPP GOP may consists of $I_0$, $P_{1,LD}$, $P_{2,LD}$, $P_{3,LD}$, $P_{4,LD}$, $P_{5,LD}$, $P_{6,LD}$, $P_{7,LD}$, $P_{8,LD}$, ..., as shown in FIG. 1, where the subscript "LD" refers to "low-delay". The low-delay P-picture is a P-picture that relies on picture from reference picture list 0 and the list 0 contains only pictures prior to the P-picture in the display order. The example of low-delay IPPP GOP structure shown in FIG. 1 uses two reference pictures. POC is an abbreviation for picture order count in the figures, which indicates the display order. In the HEVC development, a low-delay IBBB GOP structure has been disclosed. An exemplary low-delay IBBB GOP may consists of $I_0$, $B_{1,LD}$), $B_{2,LD}$, $B_{3,LD}$, $B_{4,LD}$, $B_{5,LD}$, $B_{6,LD}$, $B_{7,LD}$, $B_{8,LD}$, ..., as shown in FIG. 2, where the subscript "LD" refers to "low-delay". The low-delay B-pictures use reference pictures from reference picture list 0 and reference picture list 1, where the reference pictures from list 0 and list 1 contain only pictures prior to the B-picture in the display order, i.e., only forward-prediction used. The example of low-delay IBBB GOP shown in FIG. 2 uses two reference pictures. The upper case letter "B" refers to a reference B-picture. Again, I-pictures may be inserted periodically. Quantization parameters for I-pictures are usually smaller than those for B-pictures. In FIG. 2, GPB stands for general-purpose B and was a name tentatively used for low-delay B-pictures during HEVC development.

Figure 3:
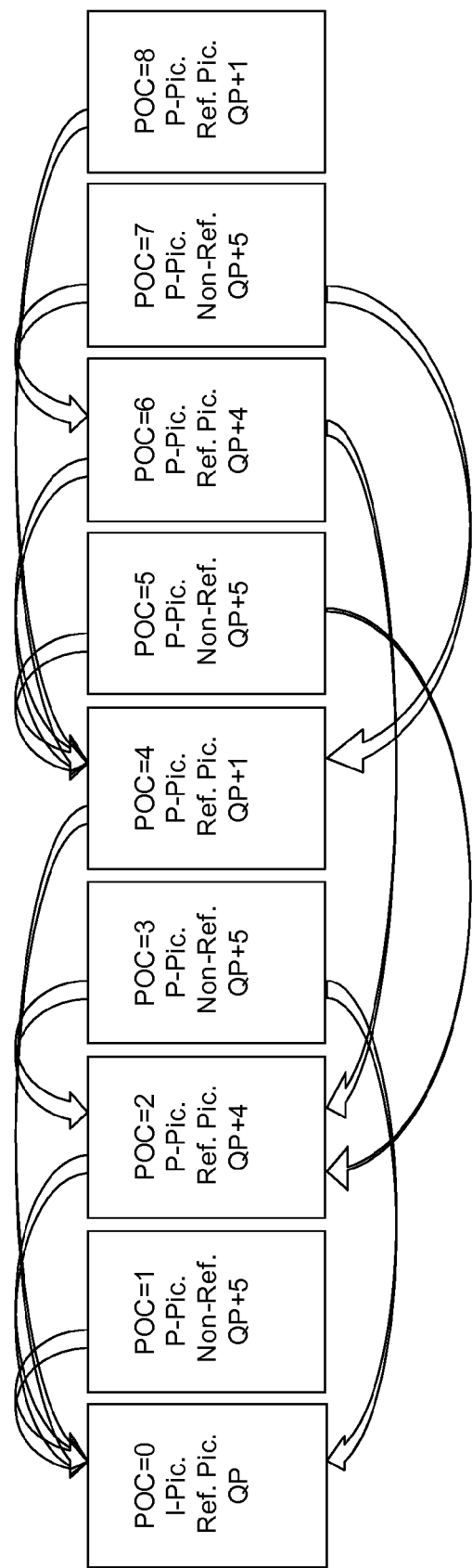
FIG. 3 illustrates a low-delay hierarchical P GOP structure using one or two reference pictures.

A low-delay hierarchical P GOP structure, which is the same as the conventional hierarchical P GOP structure, was used in the HEVC development. An example of low-delay hierarchical P GOP structure with GOP length 4 is shown in FIG. 3. In the example of FIG. 3, $P_4$ uses $I_0$ as a reference picture, $P_8$ uses $P_4$ as reference picture, $P_2$ uses $I_0$ as a reference picture, and $P_6$ uses $P_4$ and $P_2$ as reference pictures. In the highest layer, $p_1$ uses $I_0$ as a reference picture, $p_3$ uses $P_2$ and $I_0$ as reference pictures, $p_5$ uses $P_4$ and $P_2$ as reference pictures, $p_7$ uses $P_6$ and $P_4$ as reference pictures. The encoding order can also be 0, 1, 2, 3, 4, 5, 6, 7, 8, ... which is the same as the display order. Again, to achieve better system performance, the coding system applies smaller quantization parameters to the I-pictures than the P-pictures. Among the P-pictures, smaller quantization parameters are applied to the P-pictures in a lower temporal layer than the P-pictures in a higher temporal layer.

While low-delay B-pictures can be used in the IBBB GOP structure as shown above, low-delay B-pictures has also been used for B-pictures in the lowest temporal layer of a hierarchical B GOP structure in the HEVC development. For example, a hierarchical B GOP may consists of: $I_0$, $b_1$, $B_2$, $b_3$, $B_4$, $b_5$, $B_6$, $b_7$, $B_{8,LD}$, ..., $B_{16,LD}$, $B_{16,LD}$, ..., $B_{24,LD}$, ..., where the lower case letter "b" is used to designate non-reference B-pictures and the upper case letter "B" is used to designate reference B-pictures. The exemplary hierarchical B GOP structure has a GOP length of 8. The subscript "LD" letters indicates "low-delay" B-pictures. The coding order of the hierarchical B GOP shown above can be $I_0, B_{8,LD}, B_4, B_2, B_6, b_1, b_3, b_5, b_7, B_{16,LD}, B_{24,LD}, \ldots$ or $I_0, B_{8,LD}, B_4, B_2, b_1, b_3, B_6, b_5, b_7, B_{16,LD}, \ldots, B_{24,LD}, \ldots$. In the above example, pictures 8N (i.e., $I_0, B_{8,LD}, B_{16,LD}, \ldots, B_{24,LD}, \ldots$) are denoted as temporal layer 0, where N is an integer. Pictures (8N+4) are denoted as temporal layer 1, and pictures (8N+2) and (8N+6) are denoted as temporal layer 2. Pictures (8N+1), (8N+3), (8N+5) and (8N+7) are denoted as temporal layer 3. In order to support temporal scalability, a current picture cannot reference any picture belonging to a higher temporal layer than that of the current picture. In order to support random access with an arbitrary Intra picture as an entry point, an Inter picture after an Intra picture cannot reference any picture prior to the Intra picture in display order. Furthermore, to achieve better system performance, the coding system applies smaller quantization parameters to the I-pictures than those to the B-pictures. Among the B-pictures, smaller quantization parameters are applied to the B-pictures in a lower temporal layer. While the GOP length of 8 is used in the above example, larger GOP length may also be used to provide more temporal layers. For example, GOP length of 16 or 32 may be used. While pictures of the highest temporal layer in the above example are non-reference pictures, however, pictures of the highest temporal layer may also be non-reference pictures.

Figure 4:
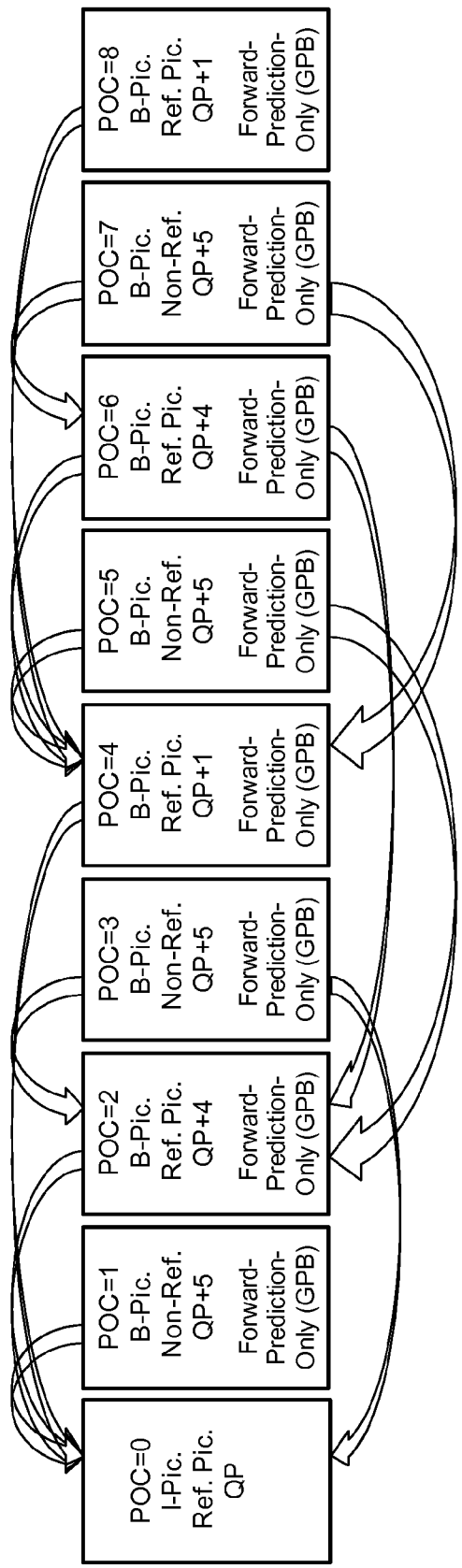
FIG. 4 illustrates an example of low-delay hierarchical B GOP structure using one or two reference pictures according to an embodiment of the present invention.
Figure 5:
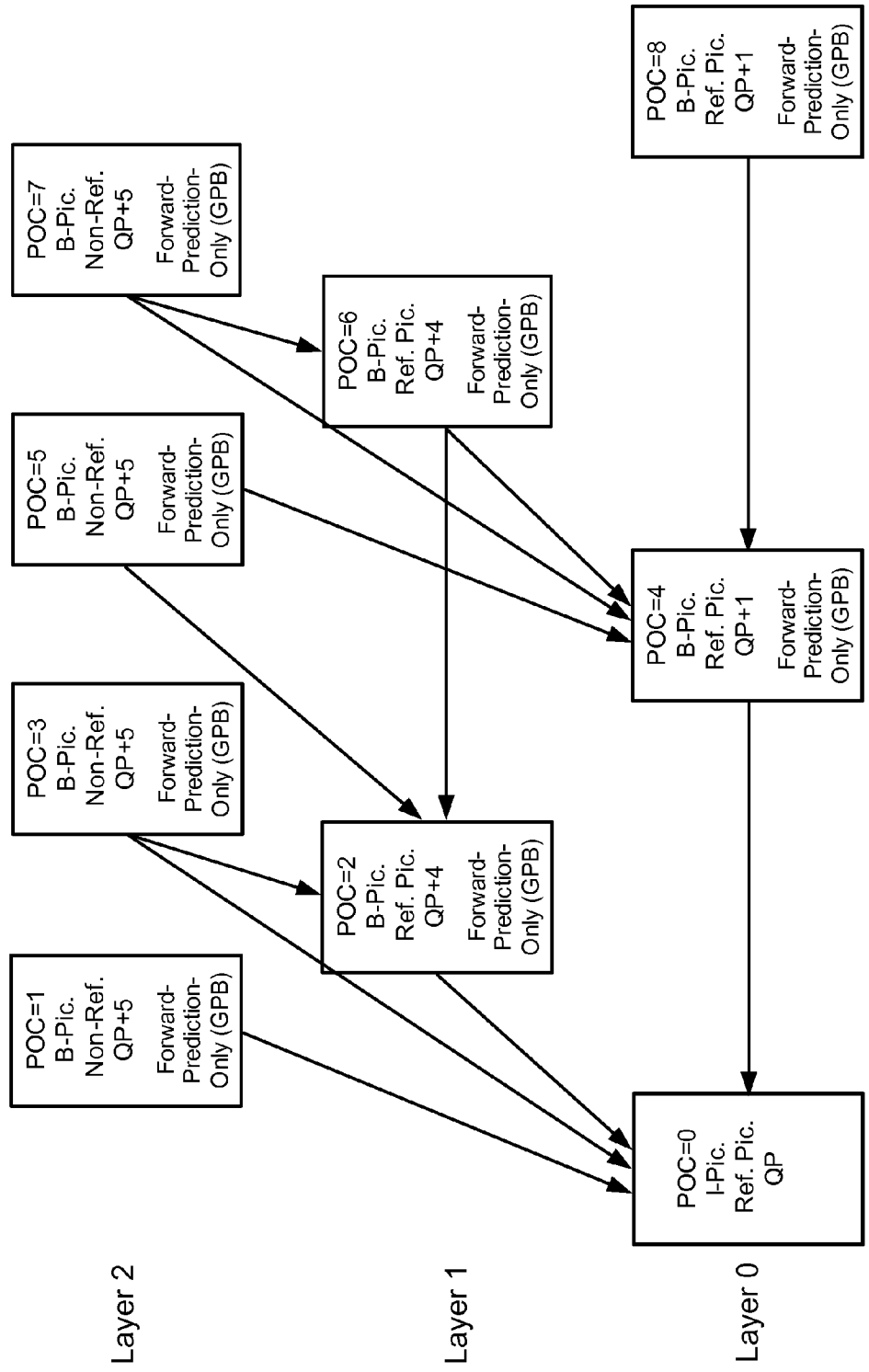
FIG. 5 illustrates the temporal hierarchical structure corresponding to the video sequence of FIG. 4.

All the B-pictures used in the IBBB GOP structure of FIG. 2 are low-delay B-pictures. On the other hand, in the hierarchical B GOP structure mention above, the low-delay B-pictures are only used in the lowest temporal layer. The current invention discloses low-delay hierarchical B GOP structure where the pictures are structured into hierarchical layers temporally and low-delay B-pictures are used beyond the lowest temporal layer. An exemplary low-delay hierarchical B GOP structure according to one embodiment of the present invention is shown in FIG. 4. The picture types for the group for this example are $I_0, b_{1,LD}, B_{2,LD}, b_{3,LD}, B_{4,LD}, b_{5,LD}, B_{6,LD}, b_{7,LD}, B_{8,LD}, \ldots$, where the numerical subscript indicates the picture number in the display order and the GOP length is 4. The pictures are organized in three temporal layers, where pictures (4N) belong to temporal layer 0, pictures (4N+2) belong to temporal layer 1, and pictures (4N+1) and (4N+3) belong to temporal layer 2. FIG. 5 illustrates the temporal hierarchical structure corresponding to the GOP structure of FIG. 4. In order to support temporal scalability, a current picture cannot reference any picture belonging to a higher temporal layer than that of the current picture. In order to support random access with an arbitrary intra picture as an entry point, any inter picture after an intra picture cannot reference any picture prior to the intra picture in display order. The B-pictures can be reference pictures or non-reference pictures, and upper case "B" and lower case "b" letters indicate reference B-pictures and non-reference B-pictures, respectively. While layer-3 pictures ($b_{1,LD}, b_{3,LD}, b_{5,LD}$, and $b_{7,LD}$) shown in this example are all non-reference pictures, these pictures in the highest temporal layer can be reference pictures as well.

For the low-delay hierarchical B GOP structure, the encoding process for the low-delay hierarchical B GOP can be the same as the display order since only low-delay B pictures are used. Furthermore, each current picture can be encoded without the dependency of any future picture and the low-delay hierarchical B GOP structure is suited for low delay applications. Nevertheless, while the low-delay hierarchical B GOP structure allows processing order to be the same as the display order, the encoder may also select other processing order to practice the present invention. In order to optimize the system performance, quantization parameters for I-pictures in this example are usually smaller than those for $B_{4N,LD}$-pictures where N can be any integer. Similarly, quantization parameters for $B_{4N,LD}$-pictures are usually smaller than those for $B_{4N+2,LD}$-pictures and quantization parameters for $B_{4N+2,LD}$-pictures are usually smaller than those for $b_{4N+1,LD}$-pictures and $b_{4N+3,LD}$-pictures. For the low-delay hierarchical B GOP structure, the coding efficiency usually is better than that for the hierarchical P GOP structure. A comparison of compression efficiency, encoding time and decoding timing for low-delay IBBB GOP (LD-IBBB), low-delay hierarchical P GOP (LD-HP), and low-delay hierarchical B GOP (LD-HB) against low-delay IPPP GOP (LD-IPPP) is shown in the following table. A negative number in the BD-Rate indicates bitrate reduction. As shown in the table, LD-IBBB is more efficient than LD-IPPP, and LD-HP is more efficient than LD-IBBB. The overall coding efficiency of LD-HB according to one embodiment of the present invention is better than LD-HP. In the case for BD-Rate (Y), LD-HB achieves additional 7.20% improvement in compression efficiency than LD-HP while the compression efficiency for BD-Rate (U) and BD-Rate (V) are about the same. Since the U and V components are usually coded in reduced spatial resolution and they represent a small portion of the total system bitrate. The 7.20% further bitrate reduction in Y component is a significant improvement of performance in the field of advanced video coding.

|  | LD-IBBB | LD-HP | LD-HB |
| --- | --- | --- | --- |
| BD-Rate (Y) | −9.50% | −21.10% | −28.30% |
| BD-Rate (U) | −12.20% | −42.70% | −42.40% |
| BD-Rate (V) | −10.30% | −38.10% | −38.30% |
| Enc. Time | 161% | 81% | 147% |
| Dec. Time | 108% | 78% | 83% |

Embodiment of encoding system with low-delay hierarchical B GOP structure according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of encoding a video sequence having a plurality of pictures, the method comprising:
   dividing the plurality of pictures into a set of group of pictures;
   dividing each group of pictures into at least two temporal layers with hierarchical structure; and
   encoding each picture in the group of pictures as an Intra coded picture (I-picture) or a low-delay Bi-predictive picture (B-picture), wherein the low-delay B-picture uses reference pictures from reference picture list 0 and reference picture list 1, and the reference pictures from the reference picture list 0 and the reference picture list 1 contain only pictures prior to the low-delay B-picture in a display order;
   wherein the I-picture is only allowed in a lowest temporal layer;
   wherein at least one low-delay B-picture is used in a non-lowest temporal layer; and
   wherein a first picture in a first temporal layer does not reference to any picture in any temporal layer higher than the first temporal layer.

2. The method of claim 1, wherein a first quantization parameter for the first picture in the first temporal layer is smaller than a second quantization parameter for a second picture in a second temporal layer higher than the first temporal layer.

3. The method of claim 1, wherein a picture in a non-highest temporal layer is used as one of the reference pictures.

4. The method of claim 1, wherein a picture in a highest temporal layer is a non-reference picture.

5. The method of claim 1, wherein the I-picture is inserted in the lowest temporal layer periodically.

6. The method of claim 1, wherein a picture in the group of pictures is encoded as a Predicted picture (P-picture).

7. The method of claim 1, wherein a coding order for encoding the picture in the group of pictures is the display order.

8. An apparatus for encoding a video sequence having a plurality of pictures, the apparatus comprising:
   means for dividing the plurality of pictures into a set of group of pictures;
   means for dividing each group of pictures into at least two temporal layers with hierarchical structure; and
   means for encoding each picture in the group of pictures as an I-picture or a low-delay B-picture, wherein the low-delay B-picture uses reference pictures from reference picture list 0 and reference picture list 1, and the reference pictures from list 0 and list 1 contain only pictures prior to the low-delay B-picture in a display order;
   wherein the I-picture is only allowed in a lowest temporal layer;
   wherein at least one low-delay B-picture is used in a non-lowest temporal layer; and
   wherein a first picture in a first temporal layer does not reference to any picture in any temporal layer higher than the first temporal layer.

9. The apparatus of claim 8, wherein a first quantization parameter for the first picture in the first temporal layer is smaller than a second quantization parameter for a second picture in a second temporal layer higher than the first temporal layer.

10. The apparatus of claim 8, wherein a picture in a non-highest temporal layer is used as one of the reference pictures.

11. The apparatus of claim 8, wherein a picture in a highest temporal layer is a non-reference picture.

12. The apparatus of claim 8, wherein the I-picture is inserted in the lowest temporal layer periodically.

13. The apparatus of claim 8, wherein a picture in the group of pictures is encoded as a Predicted picture (P-picture).

14. The apparatus of claim 8, wherein a coding order for encoding the picture in the group of pictures is the display order.

* * * * *